United States Patent Office 3,498,824
Patented Mar. 3, 1970

3,498,824
PRIMER FOR SILICONE RUBBER ADHESION
Rajendra Nath Chadha, Ann Arbor, Mich., assignor, by mesne assignments, to Stauffer-Wacker Silicone Corporation, a corporation of Delaware
No Drawing. Filed Dec. 8, 1965, Ser. No. 512,527
Int. Cl. B44d 1/22; B27k 3/34
U.S. Cl. 117—72                                      11 Claims

ABSTRACT OF THE DISCLOSURE

Silanes comprising hydrocarbonoxy and acyloxy groups are applied in solution as primers for silicone rubber adhesion.

---

This invention relates to a primer for silicone rubber adhesion and has as its principal object to provide such a primer which is effective on a variety of surfaces, including fibrous and ceramic surfaces as well as metal surfaces.

A further object of the invention is to supply a primer enabling retention of bond strength throughout the range of high and low temperatures encountered by silicone rubbers in application.

Another object is the provision of a primer which after application is still effective following long-term storage of the primed material.

Still another object is to supply a primer possessing good "wipe" characteristic i.e. a primer that is not prone to migrate during high pressure molding operations.

An additional object is to provide a primer material that is effective even when employed in highly diluted form.

Prior to the present invention it has been found necessary to manufacture primers of silicone rubber adhesion to a number of formulations, each with a different primer compound. This practice, which is quite undesirable as occasioning handling and bookkeeping problems, has been necessary because a primer compound adapted to adhere silicone rubber to one surface as steel, for instance, often is only partially effective or completely ineffective as regards other surfaces e.g. aluminum, ceramics and fabrics.

It is not meant to imply that the primer herein is a universal one, but it has been found to be effective on an unusually large number of surfaces, including, for example, cold-rolled steel, stainless steel, copper, brass, aluminum, titanium, sheet glass, wood, porcelain, asbestos, glass cloth, fabrics composed of polyester fibers or fibers derived from long-chain polymeric amides, etc.

A primer conforming to the invention comprises as an effective priming component a compound according with the formula:

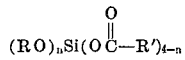

in which R is an aliphatic group of from 1 to 6 carbon atoms or, alternatively, a phenyl radical, R' is an aliphatic group of from 1 to 3 carbon atoms and $n$ is 1 or 2.

As exemplary of compounds meeting the definition supra may be mentioned:

CH₃OSi(OOCCH₃)₃
C₂H₅OSi(OOCCH₃)₃
C₃H₇OSi(OOCCH₃)₃
iC₃H₇OSi(OOCCH₃)₃
iC₃H₇OSi(OOCH)₃
iC₃H₇OSi(OOCC₂H₅)₃
(CH₃O)₂Si(OOCCH₃)₂

(C₂H₅O)₂Si(OOCCH₃)₂
(C₃H₇O)₂Si(OOCCH₃)₂
(iC₃H₇O)₂Si(OOCH₃)₂
(C₂H₅O)₂Si(OOCH)₂
(C₃H₇O)₂Si(OOCC₂H₅)₂
C₆H₅OSi(OOCCH₃)₃
(C₆H₅O)₂Si(OOCCH₃)₂

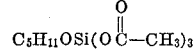

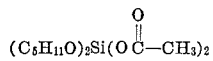

The primer compound, as indicated hereinbefore, is applied dissolved in a suitable solvent. Hydrocarbon and chlorohydrocarbon solvents e.g. benzene, xylene, toluene, cyclohexane, heptane, methylene chloride, dichlorobenzene, etc. are generally applicable as are dialkyl ethers of mono- and poly-alkylene glycols, for example.

For most applications either methylene chloride or toluene is recommended as the solvent. Using such a solvent the primer is generally applied as an 8 to 20-volume-percent solution when bonding silicone rubber to metal and ceramic surfaces. In the case of fabrics, 2 to 10-volume-percent solutions have been employed with excellent effect. Particularly good results at these concentrations in methylene chloride have been achieved using diisopropoxydiacetoxysilane as the primer compound.

In general the dialkoxy-substituted acyloxysilanes are preferred over the mono-alkoxy-substituted acyloxysilanes. Particularly preferred compounds in addition to diisopropoxydiacetoxysilane are: diphenoxydiacetoxysilane, diethoxydiacetoxysilane, di-n-propoxydiacetoxysilane and diamyloxydipropionoxysilane.

The primer solution may be applied in any suitable manner including brushing, dipping, and spraying. Either smooth or rough surfaces can be effectively primed. In the case of metals the surface should be thoroughly cleaned of oxide, grease or other contaminates using the appropriate methods: vapor degreasing, acid cleaning, light sanding followed by wiping with a degreasing solvent or sand or grit blasting. Acid-cleaned steel should be dried immediately after the water rinse to prevent rusting, a hot air-circulating oven being suggested in this connection.

Before application of the silicone rubber the primed surface should be allowed to dry completely to assure complete evaporation of the solvent and thorough activation of the primer compound, which becomes hydrolyzed from moisture contained in the ambient air. As would be supposed, activation of the primer proceeds slower at low humidities. If the drying process is accelerated through the use of a hot air oven the primed article following removal from the oven should be allowed to set for at least 30 minutes before application of the rubber.

The silicone rubber is applied over the primer in an unvulcanized state. The vulcanization of the rubber may occur through natural influences as in the case of the so-called RTV rubbers or heat and pressure may be required.

It has been determined that fabrics normally require no special treatment before priming. Both greige goods and fabrics that have been heat treated, heat set and scoured may be processed according to the invention. Here again, the primed material should be allowed to set a short time following evaporation of the solvent and prior to application of the silicone rubber coating so that hydrolysis of the primer compound can occur. The silicone rubber overcoat may be applied to the primed fabric as by calendering or knife or roller coating.

On the basis of the excellence of the results attained in the practice of the invention, it would appear that the primer compounds herein actually develop a covalent bond with both the rubbers and substrates. Patentability of the invention, however, is not predicated on any such theoretical consideration.

The invention is further illustrated by the following examples which are not to be taken as in any way limitative thereof.

EXAMPLE I

The primer solution used in this example was a 12% by volume solution of diisopropoxydiacetoxysilane in methylene chloride.

The primer solution was applied by brushing on previously cleaned stainless steel, mild steel, aluminum, copper, titanium and brass panels. Untreated panels were used for control. The primer coat was allowed to hydrolyze for 30 to 45 minutes. Room temperature vulcanizing silicone rubber was then poured onto the panels and allowed to cure. Following the curing of the RTVS rubber, an attempt was made to peel the rubber from the metal surfaces with a thin spatula. Whereas in the case of the unprimed control panels the rubber peeled cleanly off the metal with little effort, it could be removed from the primed panels only in fragments and with the greatest difficulty.

EXAMPLE II

When the following alkoxy-substituted acyloxysilanes were used in place of the diisopropoxydiacetoxysilane similarly good adhesion obtained between the rubber and the metal panels:

diethoxydiacetoxysilane
diphenoxydiacetoxysilane
ethoxytriacetoxysilane
isopropoxytriacetoxysilane
phenoxytriacetoxysilane
diethoxydipropionoxysilane
diamyloxydiacetoxysilane

EXAMPLE III

The primer solution of Example I was applied to a wood surface, a ceramic surface (mortar pestle), a glass fiber fabric and to nylon, Orlon and Dacron swatches. An excellent bond resulted in each instance, whereas the rubber peeled easily from the controls.

The invention claimed is:
1. In the application to a substrate of a silicone composition curable to a rubber, the method of increasing adhesion of the cured composition to the substrate which comprises priming the latter with a compound conforming to the formula:

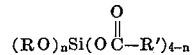

in which R is phenyl or an aliphatic group of from 1 to 6 carbon atoms, R' is an aliphatic group of from 1 to 3 carbon atoms and n is 1 or 2, said compound being deposited on the substrate in solution in an organic solvent.

2. A method according to claim 1 where the compound is diisopropoxydiacetoxysilane.

3. A method according to claim 1 where the compound is diphenoxydiacetoxysilane.

4. A method according to claim 1 where the compound is di-n-propoxydiacetoxysilane.

5. A method according to claim 1 where the compound is diethoxydiacetoxysilane.

6. A method according to claim 1 where the compound is diamyloxydiacetoxysilane.

7. Method according to claim 1 where the solvent is methylene chloride.

8. Method according to claim 7 where the concentration of the compound in such solvent on a volume basis is from 2 to 20 percent.

9. Method according to claim 1 where the solvent is toluene.

10. Method according to claim 9 where the concentration of the compound in such solvent on a volume basis is from 2 to 20 percent.

11. Method according to claim 1 where the silicone rubber is room-temperature-curing.

References Cited

UNITED STATES PATENTS

| 3,046,292 | 7/1962 | Santelli | 260—46.5 |
| 3,296,195 | 1/1967 | Goossens | 260—448.8 |
| 3,318,898 | 5/1967 | Boissieras et al. | |
| 3,377,309 | 4/1968 | Harper. | |

JULIUS FROME, Primary Examiner

T. MORRIS, Assistant Examiner

U.S. Cl. X.R.

106—287; 117—75, 124, 135.1, 148; 260—46.5, 448.8